(12) United States Patent  
Predovic et al.

(10) Patent No.: US 8,121,412 B2  
(45) Date of Patent: Feb. 21, 2012

(54) RECOGNITION OF TABULAR STRUCTURES

(75) Inventors: Goran Predovic, Belgrade (RS); Bodin Dresevic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/134,200

(22) Filed: Jun. 6, 2008

(65) Prior Publication Data

US 2009/0304282 A1    Dec. 10, 2009

(51) Int. Cl.
*G06K 9/00* (2006.01)
*G06K 9/72* (2006.01)
*G06K 9/36* (2006.01)

(52) U.S. Cl. .......... 382/187; 382/189; 382/229; 382/292

(58) Field of Classification Search .................. 382/187, 382/189, 229, 292
See application file for complete search history.

(56) References Cited

U.S. PATENT DOCUMENTS

| | | | |
|---|---|---|---|
| 5,029,223 | A | 7/1991 | Fujisaki |
| 5,481,626 | A | 1/1996 | Matsubayashi |
| 6,539,113 | B1 | 3/2003 | Van Kleeck |
| 7,181,068 | B2 | 2/2007 | Suzuki et al. |
| 2006/0062469 | A1 | 3/2006 | Li et al. |
| 2008/0008387 | A1 | 1/2008 | Cheng et al. |

OTHER PUBLICATIONS

Winkler et al. A soft-decision approach for structural analysis of handwritten mathematical expressions, 1995 IEEE, pp. 2459-2462.*
Garain, et al., "On Machine Understanding of Online Handwritten Mathematical Expressions", Proceedings of the Seventh International Conference on Document Analysis and Recognition, IEEE, 2003, pp. 6.
Ken'ichi, "A Real-Time Recognition of Handwritten Mathematical Expression Including Matrix Structure Based on Position Relations among Elements of a Matrix", IEICE Transactions on Information and Systems, vol. J86-D-2, No. 9, 2003, Japan Science and Technology Agency, p. 1.
Garain, et al., "Recognition of Online Handwritten Mathematical Expressions", IEEE Transactions on Systems, Man, and Cybernetics—Part B: Cybernetics, vol. 34, No. 6, Dec. 2004, IEEE, 2004, pp. 2366-2376.
Zanibbi, et al., "Directions in Recognizing Tabular Structures of Handwritten Mathematics Notation", Proceedings Fourth International IAPR Workshop Graphics Recognition, Sep. 2001, pp. 7.
Tapia, et al., "Recognition of On-Line Handwritten Mathematical Expressions in the E-Chalk System—An Extension", Proceedings of the Eighth International Conference on Document Analysis and Recognition, 2005, IEEE, pp. 5.

(Continued)

*Primary Examiner* — John Strege
(74) *Attorney, Agent, or Firm* — Capitol City TechLaw; Richard C. Irving

(57) ABSTRACT

A number of regions and partitions may be created based on input handwritten atoms and a grammar parsing framework. Productions for tabular structures may be added to the grammar parsing framework to produce an extended grammar parsing framework. Each of the regions may be searched for a tabular structure. Upon finding a tabular structure, a type of tabular structure may be determined. Configuration partitions may be created, based on the added productions, and added to the created partitions. A set of configuration regions may be created based on the configuration partitions and added to the created regions. The productions for tabular structures and productions of the grammar parsing framework may be applied, as rewriting rules, to the atoms to produce possible recognition results. A best recognition result may be determined and displayed. A mechanism for correcting misrecognition errors, which may occur while recognizing tabular structures, may be provided.

20 Claims, 10 Drawing Sheets

OTHER PUBLICATIONS

Mao, et al., "Document Structure Analysis Algorithms: A Literature Survey", 2003, pp. 11.

Krishnamoorthy, et al., "Syntactic Segmentation and Labeling of Digitized Pages from Technical Journals", IEEE Transactions on Pattern Analysis and Machine Intelligence, vol. 15, No. 7, IEEE, Jul. 1993, pp. 737-747.

Kim, et al., "Automated Labeling in Document Images", Proceeding SPIE, vol. 4307, Document Recognition and Retrieval VIII, 2000, pp. 1-12.

Niyogi, et al., "Knowledge-Based Derivation of Document Logical Structure", Proceedings of the Third International Conference on Document Analysis and Recognition (ICDAR'95), vol. 1, Aug. 14-16, 1995, pp. 4.

Conway, "Page Grammars and Page Parsing. A Syntactic Approach to Document Layout Recognition", Proceedings of the Second International Conference on Document Analysis and Recognition, IEEE, Oct. 20-22, 1993, pp. 761-764.

Miller, et al., "Ambiguity and Constraint in Mathematical Expression Recognition", In Proceedings of the Fifteenth National Conference on Artificial Intelligence, AAAI, 1998, pp. 8.

Tokuyasu, et al., "Turbo Recognition: A Statistical Approach to Layout Analysis", In Document Recognition VIII, San Jose, CA, Jan. 2001, pp. 8.

Kanungo, et al., "Stochastic Language Model for Style-Directed Physical Layout Analysis of Documents", IEEE Transactions on Image Processing, vol. 12, No. 5, May 2003, IEEE, pp. 583-596.

Blostein, et al., "Applying Compiler Techniques to Diagram Recognition", Proceedings 16th IAPR International Conference on Pattern Recognition, vol. 3, 2002, pp. 4.

Matsakis, et al., "Recognition of Handwritten Mathematical Expressions", Submitted to the Department of Electrical Engineering and Computer Science, May 21, 1999, Copyright Nicholas E. Matsakis, pp. 1-59.

Lafferty, et al., "Conditional Random Fields: Probabilistic Models for Segmenting and Labeling Sequence Data", Proceedings of the 18th International Conference on Machine Learning, 2001, pp. 8.

Taskar, et al., "Max-Margin Parsing", Proceedings of the Conference on Empirical Methods for Natural Language Processing, 2004, pp. 8.

Charniak, et al., "Edge-Based Bestfirst Chart Parsing", In Proceedings of the Fourteenth National Conference on Artificial Intelligence, 1998, pp. 7.

Klein, et al., "A Parsing: Fast Exact Viterbi Parse Selection", Proceedings of the 2003 Conference of the North American Chapter of the Association for Computational Linguistics on Human Language Technology, vol. 1, pp. 8.

Liang, et al., "Efficient Geometric Algorithms for Parsing in Two Dimensions", Submitted to International Conference on Document Analysis and Recognition (ICDAR), 2005, pp. 1-6.

Rabiner, "A Tutorial on Hidden Markov Models", Proceedings of the IEEE, vol. 77, No. 2, Feb. 1989, IEEE, pp. 257-286.

Collins, "Discriminative Training Methods for Hidden Markov Models: Theory and Experiments with Perceptron Algorithms", Proceedings of the ACL-02 conference on Empirical methods in natural language processing, vol. 10, Annual Meeting of the ACL, 2002, pp. 8.

Freund, et al., "A Decision-Theoretic Generalization of On-Line Learning and an Application to Boosting", Journal of Computer and System Sciences 55, Academic Press, 1997, pp. 119-139.

Phillips, et al., "CD-ROM Document Database Standard", Proceedings of the Second International Conference on Document Analysis and Recognition, Oct. 20-22, 1993, IEEE, pp. 478-483.

Viola, et al., "Rapid Object Detection Using a Boosted Cascade of Simple Features", Proceedings of the 2001 IEEE Computer Society Conference on Computer Vision and Pattern Recognition, 2001, CVPR, vol. 1, Mitsubishi Electric Research Laboratories, pp. 13.

Bengio, et al., "Word Normalization for Online Handwritten Word Recognition", Proceedings of the 12th Pattern Recognition, vol. 2, Conference B: Computer Vision & Image Processing, 1994, pp. 5.

Blostein, et al., "Recognition of Mathematical Notation", Handbook on Optical Character Recognition and Document Analysis, World Scientific Publishing Company, 1996, pp. 1-26.

Chhabra, "Graphic Symbol Recognition: An Overview", Lecture Notes in Computer Science, Selected Papers from the Second International Workshop on Graphics Recognition, Algorithms and Systems, vol. 1389, 1998, Springer-Verlag, pp. 68-79.

Chan, et al., "Mathematical Expression Recognition: A Survey", International Journal on Document Analysis and Recognition, vol. 3, No. 1, 1999, Department of Computer Science, Hong Kong University of Science and Technology, pp. 1-13.

Freund, et al., "Experiments with a New Boosting Algorithm", In Proceedings of the Thirteenth International Conference on Machine Learning, Jan. 22, 1996, pp. 16.

Plamondon, et al., "On-Line and Off-Line Handwriting Recognition: A Comprehensive Survey", IEEE Transactions on Pattern Analysis and Machine Intelligence, vol. 22, No. 1, Jan. 2000, IEEE, pp. 63-84.

Schapire, et al., "Improved Boosting Algorithms using Confidence-Rated Predictions", Machine Learning, vol. 37, No. 3, Dec. 1999, pp. 1-40.

Shilman, et al., "Discerning Structure from Freeform Handwritten Notes", Seventh International Conference on Document Analysis and Recognition (ICDAR'03), Institute of Electrical and Electronics Engineers, Inc., vol. 1, 2003, pp. 6.

Smithies, et al., "A Handwriting-Based Equation Editor", Proceedings of the 1999 conference on Graphics interface, Morgan Kaufmann Publishers Inc., Jun. 1999, pp. 8.

Tappert, et al., "The State of the Art in Online Handwriting Recognition", IEEE Transactions on Pattern Analysis and Machine Intelligence, vol. 12, No. 8, Aug. 1990, IEEE, pp. 23.

Viola, et al., "Robust Real-Time Face Detection", International Journal of Computer Vision, vol. 57, No. 2, Kluwer Academic Publishers, 2004, pp. 137-154.

\* cited by examiner

FIG. 1
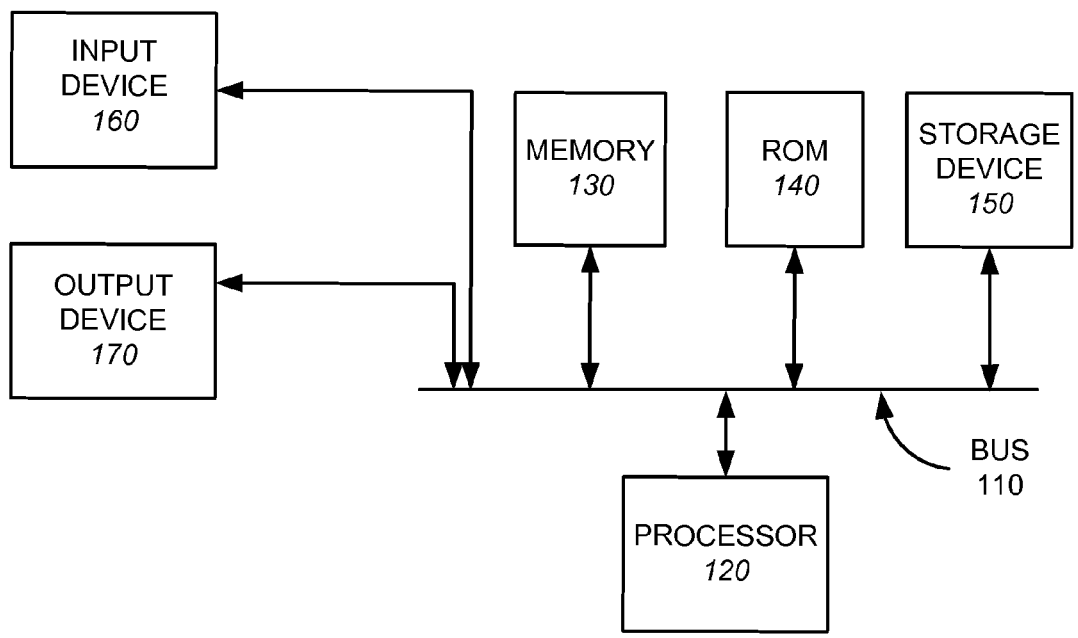
FIG. 2
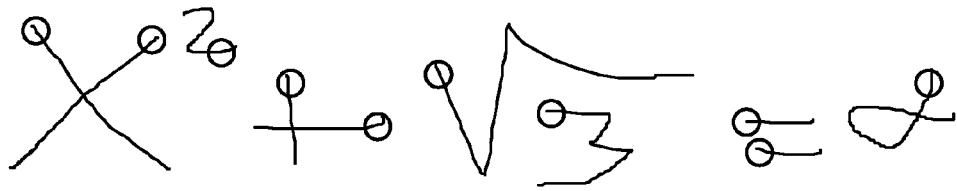
FIG. 3

RECOGNITION OF TABULAR STRUCTURES

BACKGROUND

Many state-of-the-art processing devices, such as tablet personal computers (PCs) or other processing devices, permit a user to provide input as digital ink. The digital ink may include one or more handwritten strokes, which a processing device may display as ink while the one or more handwritten strokes are being input. A handwritten stroke may begin when a writing instrument lands on a writing surface, and may end when the writing instrument is lifted off the writing surface. The writing surface may include a display screen, which may further include a digitizer, and the writing instrument may be an electronic or non-electronic pen, a stylus, a use's own finger, a pointing device, such as, for example, a computer mouse, or another writing instrument.

A user may input one or more handwritten strokes, as digital ink, to form a two-dimensional structure. The two-dimensional structure may include a mathematical expression, a chemical formula, textual characters, numbers, or other two-dimensional structures. The mathematical expression may include a tabular structure, such as, for example, a matrix, or a multiline expression.

A recognizer may produce a recognition result based on the input one or more strokes. Occasionally, the recognized result may include a misrecognized portion. The user may attempt to correct the misrecognized portion by selecting the misrecognized portion of the recognition result. In at least one existing recognizer, the user may attempt to correct a misrecognized character of the recognition result by selecting the digital ink corresponding to the misrecognized character. Selecting the misrecognized portion of the recognition result, or selecting the digital ink corresponding to the misrecognized character in the recognition result, may cause one or more alternates to be displayed. The user may select one of the one or more alternates, thereby causing the misrecognized character to be replaced with the selected one of the one or more alternates without re-recognizing the input digital ink. One existing recognizer permits the user to type a correct character from a keyboard when the correct character is not among the displayed one or more alternates.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device are provided for recognizing a handwritten two-dimensional structure, such as, for example, a mathematical expression including a tabular structure. The tabular structure may be a matrix, a multiline expression, or another type of tabular structure.

A grammar parsing framework includes a number of rewriting rules for producing productions of non-terminal and terminal objects. In embodiments consistent with the subject matter of this disclosure, the grammar parsing framework may be extended to provide support for recognizing matrices, multiline expressions, or other tabular structures.

Configuration regions (ConfRegions) may be defined as regular document regions which are tagged with a configuration attribute. Configuration partitions (ConfPartitions) may be defined as regular document partitions which include ConfRegions and tags with a configuration attribute. ConfPartitions and associated tags may be created and added to a set of partitions not pruned from a document. Regions included in the configuration partitions may be created as ConfRegions and added to a set of regions not pruned from the document. A set of productions for tabular structures may be defined and added to the grammar parsing framework.

When a recognizing a group of atoms in a document, a set of regions and partitions may be created and pruned according to the grammar parsing framework. Each remaining region may be searched for existence of a tabular structure, such as, for example, a matrix, a multiline expression, or other tabular structure. Upon finding a candidate tabular structure, a type of tabular structure may be determined and a set of ConfPartitions may be produced. Based on the ConfPartitions, a set of ConfRegions may be produced. The ConfRegions and the ConfPartitions may be added to a set of regions and a set of partitions, which remain after pruning. Sets of rewriting rules may be applied to atoms of the input handwritten two-dimensional structure to produce possible recognition results. A best recognition result may be selected from the possible recognition results and displayed based on a sum of scores assigned to ones of the rewriting rules used to produce respective possible recognition results.

Embodiments consistent with the subject matter of this disclosure may provide a method and a processing device for correcting errors which may occur in tabular structures. For example, tabular structures may be misrecognized as having too many rows or too many columns (over-grouping). A mechanism for correcting over-grouping of tabular structures may be provided in various embodiments. Further, crowded rows or columns of tabular structures may be misrecognized as a single row or column (under-grouping). A mechanism for correcting under-grouping of tabular structures may be provided in some embodiments.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates a functional block diagram of an exemplary processing device, which may implement embodiments consistent with subject matter of this disclosure.

FIGS. 2-3 illustrate an exemplary mathematical expression formed from a group of handwritten atoms or strokes.

Figure 4:
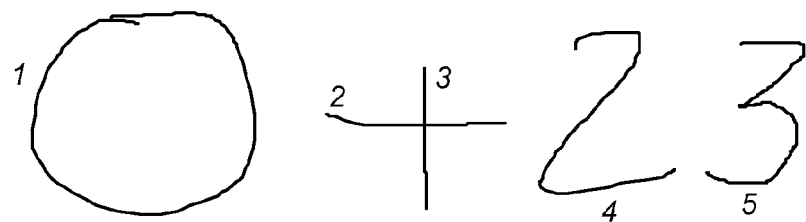
FIG. 4 illustrates a second exemplary mathematical expression formed from a group of handwritten atoms or strokes.

FIGS. 12-15 display examples of corrections being made to tabular structures in embodiments consistent with the subject matter of this disclosure.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for recognizing handwritten two-dimensional structure, which may include a mathematical expression further including a tabular structure, such as, for example, a matrix, a multiline expression, or another tabular structure. A grammar parsing framework may be extended, such that tabular structures may be recognized.

A user may input digital ink as a number of strokes, or atoms. The processing device may process the input digital ink to produce a recognition result, which may be presented, or displayed, to a user. The processing device may have one or more recognizers for scoring non-terminal productions, or structures, and terminal productions, or symbols. In this application, the term "terminal production" refers to a grammar terminal production, or symbol, which is a non-divisible grammar production. Examples of terminal productions may include, but not be limited to, letters that denote variable names, digits, mathematical operators and symbols.

A number of regions, including at least one atom of the digital ink, and partitions, including a pair of regions, may be created for use during recognition of the input digital ink. The number of regions may be exponential with respect to a number of atoms, and the number of partitions may be even larger. The number of partitions and the number of regions may be pruned, such that a remaining number of partitions and a remaining number of regions may be suitable for computation purposes.

A tabular structure, such as, for example, a matrix, a multiline expression, or other tabular structure, may be detected. A type of the tabular structure may be determined, and atoms may be assigned to grouping structures, such as, for example, left and right brackets, or other grouping structures, and to each matrix cell of the tabular structure. Based on the assignment of the atoms, configuration regions and configuration partitions with appropriate tags may be created. All configuration partitions and associated tags may be created and added to remaining ones of the partitions. All regions, included in the configuration partitions, may be created as configuration regions with a tag of TagConfRegion and added to remaining ones of the regions.

A grammar of the grammar parsing framework may include a number of rewriting rules for producing non-terminal and terminal objects, or productions. The grammar may be extended by adding a definition of a new structure, configuration partition, as an extension of a partition structure. Rewriting rules for configuration productions may further be added to the grammar. The rewriting rules of the grammar may be applied to one or more atoms in a region to produce non-terminal and/or terminal productions. As a rewriting rule is applied to a region or a configuration region, partitions or configuration partitions may be created for use during recognition. The rewriting rules may be applied until all atoms are recognized as being included in terminal productions. As a rewriting rule is applied to the one or more atoms, a score may be associated with the applied rewriting rule. Thus, for example, the score for a particular recognition result may be a sum of rewriting rules applied to produce the recognition result. The rewriting rules may be applied to the one or more atoms in a number of different ways to produce multiple possible recognition results. One of the possible recognition results having a best score may be selected as the recognition result. In various embodiments, a best score may be a highest score among scores of possible recognition results. In other embodiments, a best score may be a lowest score among the scores of possible recognition results.

Occasionally, recognition results may have a misrecognized portion within a tabular structure. Misrecognition of atoms may occur for a number of reasons, such as, for example poor handwriting, crowded placement of atoms, sparse placement of atoms, or other reasons. For example, atoms may be input in such a way that atoms of a tabular structure, which should be included in a single matrix cell, may be recognized as being in multiple matrix cells. Further, atoms may be input such that crowding occurs resulting in multiple rows or columns of a tabular structure being recognized as a single row or column, respectively. Embodiments consistent with the subject matter of this disclosure, may provide a method and a processing device for correcting errors that occur in tabular structures.

Exemplary Processing Device

FIG. 1 is a functional block diagram of an exemplary processing device 100, which may be used in embodiments consistent with the subject matter of this disclosure. Processing device 100 may include a bus 110, an input device 160, a memory 130, a read only memory (ROM) 140, an output device 150, a processor 120, and a storage device 150. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include compact disc (CD), digital video disc (DVD), a magnetic medium, or other type of storage medium for storing data and/or instructions for processor 120.

Input device 160 may include a keyboard, a touchscreen, or other input device. If input device 160 includes a touchscreen, the touchscreen may further include a digitizer for receiving input from a writing device, such as, for example, an electronic or non-electronic pen, a stylus, a user's finger, or other writing device. In one embodiment, input device 160 may include a pointing device, such as, for example, a computer mouse, or other pointing device. Output device 170 may include one or more conventional mechanisms that output information, including one or more display monitors, or other output devices.

Processing device 100 may perform such functions in response to processor 120 executing sequences of instructions contained in a machine-readable storage medium, such as, for example, memory 130, ROM 140, storage device 150 or other machine-readable storage media. Such instructions may be read into memory 130 from another machine-readable storage medium or from a separate device via a communication interface (not shown).

Grammar Parsing Framework

A grammar parsing framework is one method for recognizing handwritten or printed mathematical equations, chemical formulas, text structures, and graphs, as well as other two-dimensional structures.

A document may be defined as an object subject to recognition, such as, for example, a handwritten mathematical expression, handwritten text, a scanned image of a printed mathematical expression or printed text, a handwritten page of ink drawings, text and diagrams, as well as other handwritten or scanned two-dimensional structures. FIG. 2 shows an exemplary document including a handwritten mathematical expression.

Recognition may be defined as a process of transforming a document into a form understandable by a machine. For example, a handwritten mathematical expression may be transformed to plain text in a MathML format, a Latex format, or another format. The transformed document may be read and searched by a machine and may be suitable for storing and indexing.

A document atom may be defined as an indivisible part of a document and a document may be a collection of atoms. If a document is written in digital ink, then an atom of the document may be a single stroke of the digital ink. In FIG. 3, each of the atoms of FIG. 2 is circled. As one can see, the mathematical expression of FIGS. 2 and 3 includes 10 atoms.

A document region may be defined as a collection of atoms from a given document. A region R containing atoms $a_1$, $a_2$, and $a_4$ may be written as $R=\{a_1, a_2, a_4\}$. A size of a region R may be defined as a number of atoms in the region and may be written as $\|R\|$. A maximal document region may be defined as a region that contains all atoms from a document. A maximal document region R may be written as R=D.

A document partition may be defined as a pair of document regions, written as $P=(R_1,R_2)$, such that $R_1$ and $R_2$ have no atoms in common ($R_1 \cap R_2 = 0$). Partition P belongs to a region R if ($R_1 \cup R_2 = R$).

A binary context-free grammar (hereinafter referred to as a grammar) may be defined as a triplet G=(T, S, P) where:
1. T is a finite set of terms, $T=\{t_1, t_2, t_3, \ldots, t_n\}$;
2. S is a starting term, such that S∈T;
3. P is a finite set of productions, $P=\{p_1, p_2, p_3, \ldots, p_k\}$.
   a. A production may be one of: a binary production, a unary production or a terminal production.
   b. A binary production may be defined as a triplet of terms, $p=(t_i, t_j, t_k)$, written as:

$t_i \rightarrow t_j t_k$ c. A unary production may be defined as a pair of terms, $p=(t_i, t_j)$, written as:

$t_i \rightarrow t_j$ d. A terminal production may be defined as a singleton of a term, $p=(t_i)$, written as:

$t_i \rightarrow$

All three forms of productions may be written simply as ($t_i$, $t_j$, $t_k$) by allowing $t_j$ and $t_k$ to be empty sets. Therefore, a unary production may be written as $t_i \rightarrow t_j 0$ and a terminal production may be written as $t_i \rightarrow 0\ 0$.

Given a grammar G=(T, S, P), words may be defined as all n-tuples with elements from the set of terms T.
Word examples may include:

$w_1 = (t_2, t_1)$ $w_2 = (t_2)$ $w_3 = (t_5, t_5, t_1, t_5)$

A rewriting step may be defined as a transformation of one word into another word by applying a rewriting rule. Word $w_1$ being transformed into word $w_2$, may be written as $w_1 \rightarrow w_2$, using production A→BC as a rewriting rule if:

$w_1 = (\alpha, A, \beta)\ ^\wedge w_2 = (\alpha, B, C, \beta)$

For example, rewriting steps, which follow, with annotated rewriting rules may be performed:

| | |
|---|---|
| (a, x, d) → (a, b, c, d) | x → b c |
| (a, x, d) → (a, y, d) | x → y |
| (a, x, d) → (a, d) | x → |

A sequence of rewriting steps may be defined as a procedure of performing rewriting steps one by one. The sequence of rewriting steps may be written as:

$w_1 \rightarrow w_2 \rightarrow w_3 \rightarrow w_4 \rightarrow \square$

Terminal words in a grammar G may be defined as all words $w_1 = (t_1, t_2, \ldots, t_k)$ such that $t_i \rightarrow$ are terminal productions from G.

Grammar words may be defined as all terminal words in a given grammar G that exist in some sequence of rewriting steps starting from a word $w_s = (S)$ (a starting word may include only a grammar starting term). If word w is a grammar word, this may be written as:

$(S) \rightarrow^* w_s$

A process of pruning regions and partitions from a document may be called document parsing. If the document includes handwritten ink, the process may be called ink parsing.

Recognition Example

A simple exemplary grammar for recognition of numbers and basic arithmetic operations (called numbers grammar) may be defined as following:
1) G=(T, S, P)
2) T={Math, Number, Op, OpNumber, DigitList, Digit, Digit9, 0, 1, 2, 3, 4, 5, 6, 7, 8, 9, +, −}
3) S=Math
4) P={
Math→Number,
Math→Math OpNumber,
OpNumber→Op Number,
Op→+,
Op→−,
+→,
−→,
Number→Digit,
Number→Digit9 DigitList,
DigitList→Digit,
DigitList→DigitList Digit,
Digit→Digit9,
Digit→0,
Digit9→1, Digit9→2,
Digit9→3,
Digit9→4,
Digit9→5,
Digit9→6,
Digit9→7,
Digit9→8,
Digit9→9,
0→,
1→,
2→,
3→,
4→,
5→,
6→,
7→,
8→,
9→,
}

Production names in the simple exemplary grammar are almost all self-explanatory; production Digit9 may represent all digits but zero, production Digit9 exists to ensure that words like '012' may not be generated by the grammar.

The exemplary grammar is a simple grammar which is able to generate words like: 0, 12, 0+12−2000, 1+2+3, etc. A full-size grammar that supports university level mathematics may have thousands of productions and terms.

An exemplary document to recognize is illustrated in FIG. 4. In FIG. 4, every atom is assigned a numerical identifier (1, 2, 3, 4, 5). A sequence of rewriting steps, or rules that may be used to recognize the exemplary document may be as follows:

1. (Math, {1, 2, 3, 4, 5})
   a. apply rule: Math→Math OpNumber, {1, 2, 3, 4, 5}→{1} {2, 3, 4, 5}
2. (Math, {1}), (OpNumber, {2, 3, 4, 5})
   a. apply rule: Math→Number, {1}→{1}
3. (Number, {1}), (OpNumber, {2, 3, 4, 5})
   a. apply rule: Number→Digit, {1}→{1}
4. (Digit, {1}), (OpNumber, {2, 3, 4, 5})
   a. apply rule: Digit→0, {1}→{1}
5. (0, {1}), (OpNumber, {2, 3, 4, 5})
   a. 0→is a terminal production
   b. apply rule: OpNumber→Op Number, {2, 3, 4, 5}→{2, 3} {4, 5}
6. (0, {1}), (Op, {2, 3}), (Number, {4, 5})
   a. apply rule: Op→+, {2, 3}→{2, 3}
7. (0, {1}), (+, {2, 3}), (Number, {4, 5})
   a. +→is a terminal production
   b. apply rule: Number→Digit9 DigitList, {4, 5}→{4} {5}
8. (0, {1}), (+, {2, 3}), (Digit9, {4}), (DigitList, {5})
   a. apply rule: Digit9→2, {4}→{4}
9. (0, {1}), (+, {2, 3}), (2, {4}), (DigitList, {5})
   a. 2→is a terminal production
   b. apply rule: DigitList→Digit, {5}→{5}
10. (0, {1}), (+, {2, 3}), (2, {4}), (Digit, {5})
    a. apply rule: Digit→3, {5}→{5}
11. (0, {1}), (+, {2, 3}), (2, {4}), (3, {5})
    a. 3→is a terminal production
12. Recognition finished.

A recognition result from the above example is '0+23'. Symbol '0' is assigned with region {1} (i.e. atom with identifier 1 is recognized as symbol '0'). Symbol '+' is assigned with region {2, 3} (i.e. a group of atoms with identifiers 2 and 3 is recognized as symbol '+'). Symbol '2' is assigned with region {4} and symbol '3' is assigned with region {5}.

There are many combinations of rewriting rules that may be used to recognize the exemplary document of FIG. 4. A recognition engine may assign scores for each of the rewriting rules. A score for a particular recognition result may be a sum of all scores for all rewriting rules used to produce the particular recognition result. A best recognition result may be a recognition result having a best score. Typically, the best score is a highest score. Although, in some embodiments, a best score may be a lowest score.

A following formula may be used to find a best recognition result:

$$C(A, R_0) = \max_{\substack{A \to BC \\ R_1 \cap R_2 = 0 \\ R_1 \cup R_2 = R_0}} C(B, R_1) + C(C, R_2) + \text{score}(A \to BC, R_0, R_1, R_2) \quad \text{Equ. 1}$$

where score( ) may be a score assigned to a rewriting rule and C(A, R) may be a best result, so far, for a given term, A, on a given region, R.

Score( ) may be defined for binary, unary, and terminal productions. For binary productions, score may have a form as shown above in Equ. 1. For unary productions, score may have a form score($A \to B0, R_0, R_1, 0$).

For terminal productions, score may have a form score($A \to 00, R_0, 0, 0$).

Defining Matrices in a Binary Context Free Grammar

A binary context free grammar is not suitable for describing matrices, multiline expressions, and other tabular structures. A matrix is a set of rows and each row is a set of cells, such that, in a regular matrix, each row has a same number of cells. Matrices may be of types 2×2, 2×3, 4×4, . . . , m×n, etc. It is not possible to define all possible types of matrices with a finite number of productions. In a context free grammar each matrix type may be defined specifically. However, such an approach is not general and has a number of issues such as, for example, proper alignment of matrix columns and rows, as well as other issues.

In embodiments consistent with the subject matter of this disclosure, the grammar parsing framework may be extended with support for tabular structures, such as, for example, matrices, multiline expressions, and other tabular structures, by putting a limitation on grammar productions, document regions and document partitions, instead of changing anything in a core of the grammar parsing framework.

A configuration production (ConfProduction) may be a new structure defined as an extension of production structures of the grammar parsing framework. ConfProduction may be represented as a structure pair of a regular production and a tag. A tabular structure, such as, for example, matrices may be defined with a number of configuration productions (ConfProductions) as follows:

Matrix productions:

| Left hand side | | Right hand side | | Tag |
|---|---|---|---|---|
| Matrix | → | LeftBracket | MatrixBodyRightBracket | TagMatrixBracket |
| MatrixBodyRightBracket | → | MatrixBody | RightBracket | TagMatrixBracket |
| MatrixBody | → | MatrixRows | | |
| MatrixRows | → | MatrixRows | MatrixRow | TagMatrixRows |
| MatrixRows | → | MatrixRow | | |
| MatrixRow | → | MatrixCells | | |
| MatrixCells | → | MatrixCells | MatrixCell | TagMatrixCells |
| MatrixCells | → | MatrixCell | | |
| MatrixCell | → | Expression | | |

Terms LeftBracket, RightBracket and Expression may be existing terms in the grammar. LeftBracket may represent a left grouping structure, such as, for example, a left bracket, a left parenthesis, or other left grouping structure. Right-Bracket may represent a right grouping structure such as, for example, a right bracket, a right parenthesis, or other right grouping structure.

Multiline expressions may be defined by productions which are very similar to the matrix productions. The multiline expression productions lack a right bracket and a row is directly expanded into a single cell, rather than multiple cells. The multiline expression productions are as follows:

Multiline expression productions:

| Left hand side | | Right hand side | | Tag |
|---|---|---|---|---|
| MultiLineExpr | → | LeftBracket | MultiLineExprBody | TagMatrixBracket |
| MultiLineExprBody | → | MultiLineExprRows | | |
| MultiLineExprRows | → | MultiLineExprRows | MultiLineExprRow | TagMatrixRows |
| MultiLineExprRows | → | MultiLineExprRow | | |
| MultiLineExprRow | → | Expression | | |

The multiline expression productions and the matrix productions may be collectively referred to as matrix productions in the specification.

Configuration regions (ConfRegions) may be defined as regular document regions which are tagged with a configuration attribute. Configuration partitions (ConfPartitions) may be defined as regular document partitions which include ConfRegions and tags with a configuration attribute.

Figure 5:
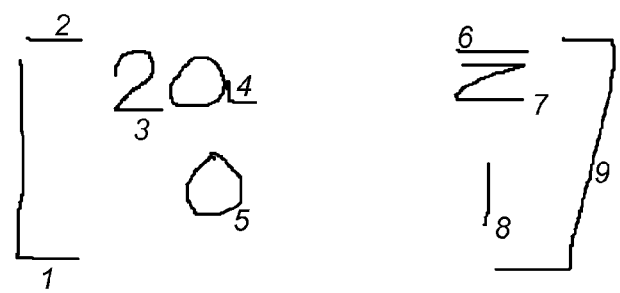
FIG. 5 illustrates an exemplary tabular structure, which may be recognized in an embodiment consistent with the subject matter of this disclosure.

FIG. 5 illustrates an exemplary matrix made from a number of atoms. Each atom of FIG. 5 has a numeral identifier. Atoms (1, 2) form a left bracket and atom (9) forms a right bracket.

A process for detecting tabular structures, such as, for example, matrices and multiline expressions, may be called for every region remaining after ink parsing completes pruning of regions. The process may include a number of steps. In some embodiments the steps may include:

1. Left grouping structure detection. If a left grouping structure is not detected, a matrix or multiline expression is not found.
2. Right grouping structure detection. If a right grouping structure does not exist, a matrix is not detected. If right grouping structure is detected, a multiline expression is not detected.
3. Strokes (atoms) that are assigned to the left grouping structure (and to the right grouping structure in case of a matrix) may be removed from the region. Matrix (or multiline expression) body goes through further steps.
4. Remaining matrix body strokes (atoms) may then be projected on an x-axis and a y-axis (see FIG. 6 which shows all atoms of the matrix of FIG. 5, except for atoms assigned to a left grouping structure (1, 2) and a right grouping structure (9), being projected onto the x-axis and the y-axis). Based on this, an initial matrix type may be determined (matrix type may be denoted with two integers, m and n, where m is a number of rows and n is a number of columns). Each stroke may be assigned to a single cell based on its position.
5. Merging of columns and rows may then be performed. If the matrix contains empty cells (which is possible after step (4)), a row or a column that contains one or more empty cells may be merged with a row below/above or with a column to the left/right.
6. A final number of rows m and a final number of columns n may then be validated. Multiline expression detection fails if n>1, matrix and multiline expression detection fails if m=n=1.
7. On a same region, several different matrix and multiline expression configurations may be detected.
8. For each configuration detected, ConfRegions and ConfPartitions may be created with appropriate tags.

A matrix of type m×n (m rows and n columns) may be presented, in terms of regions, as:

$R_{1,1}$ - - - $R_{1,n}$ $R_{lb}$ - - - - - - - - $R_{rb}$ $R_{m,1}$ - - - $R_{m,n}$ where $R_{lb}$ and $R_{rb}$ may be left and right brackets, respectively, $R_{1,1}$ may be a top left cell and $R_{m,n}$ may be a bottom right cell. The following ConfPartitions and tags may be created:
1) ($\{R_{lb}\}, \{R_{1,1}, \ldots, R_{m,n}, R_{rb}\}$), TagMatrixBracket (partition of left grouping structure and remaining matrix)
2) ($\{R_{1,1}, \ldots, R_{m,n}\}, \{R_{rb}\}$), TagMatrixBracket (partition of matrix body and right bracket)
3) ($\{R_{1,1}, \ldots, R_{1,n}\}, \{R_{2,1}, \ldots, R_{m,n}\}$), TagMatrixRows (partition of the first row and remaining rows)
4) ($\{R_{2,1}, \ldots, R_{2,n}\}, \{R_{3,1}, \ldots, R_{m,n}\}$), TagMatrixRows (partition of the second row and remaining rows)
5) - - -

6) $(\{R_{k,1}, \ldots, R_{k,n}\}, \{R_{k+1,1}, \ldots, R_{m,n}\})$, TagMatrixRows (partition of the k-th row and remaining rows)

7) - - -

8) $(\{R_{m-1,1}, \ldots, R_{m-1,n}\}, \{R_{m,1}, \ldots, R_{m,n}\})$, TagMatrixRows (partition of last two rows)

Each row may further be expanded into ConfPartitions. The following shows expansion of the k-th row:

1) $(\{R_{k,1}\}, \{R_{k,2}, \ldots, R_{k,n}\})$, TagMatrixCells (partition of first cell and remaining cells)

2) - - -

3) $(\{R_{k,t}\}, \{R_{k,t+1}, \ldots, R_{k,n}\})$, TagMatrixcells (partition of t-th cell and remaining cells)

4)

5) $(\{R_{k,n-1}\}, \{R_{k,n}\})$, TagMatrixCells (partition of last two cells)

The ConfPartitions and associated tags may be created and added to a set of partitions not pruned from a document. All regions that are part of the ConfPartitions may be created as ConfRegions with a respective associated tag TagConfRegion and added to a set of regions not pruned from the document.

Figure 6:
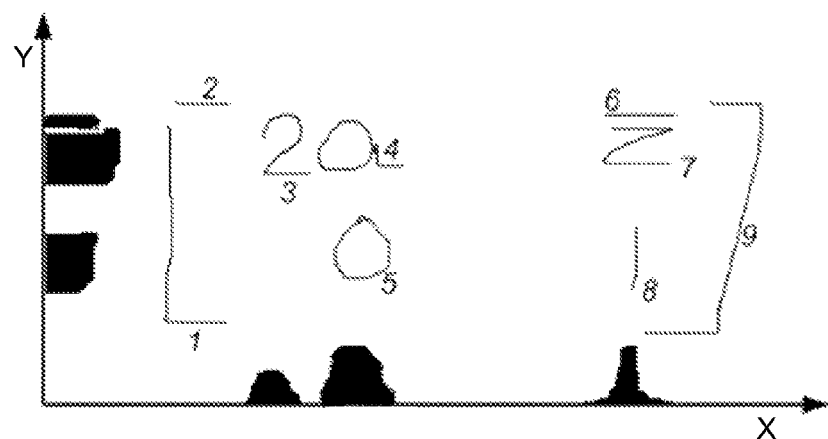
FIG. 6 shows the tabular structure of FIG. 5 and projections of atoms of a body of the tabular structure onto an x-axis and a y-axis, which may be used to determine a type of the tabular structure in some embodiments consistent with the subject matter of this disclosure.

With respect to the example of FIGS. 5 and 6, the following ConfRegions and ConfPartitions may be created with appropriate tags:

| ConfRegion | ConfPartitions (P = ($R_0$, $R_1$)) | | Tag |
|---|---|---|---|
| {1, 2, 3, 4, 5, 6, 7, 8, 9} | $R_0$ | $R_1$ | TagConfRegion |
| | {1, 2} | {3, 4, 5, 6, 7, 8, 9} | TagMatrixBracket |
| {3, 4, 5, 6, 7, 8, 9} | | | TagConfRegion |
| | {3, 4, 5, 6, 7, 8} | {9} | TagMatrixBracket |
| {3, 4, 5, 6, 7, 8} | | | TagConfRegion |
| | {3, 4, 6, 7} | {5, 8} | TagMatrixRows |
| {3, 4, 6, 7} | | | TagConfRegion |
| | {3, 4} | {6, 7} | TagMatrixCells |
| {5, 8} | | | TagConfRegion |
| | {5} | {8} | TagMatrixCells |

Two constraints may be added to rewriting rules specific to ConfProductions, ConfRegions and ConfPartitions. Whenever any ConfProductions, ConfRegions or ConfPartitions are part of a rewriting rule, the constraints may be checked and the rewriting rule may be processed in a particular way. The constraints may ensure that only matrices (or multiline expressions) with a specific configuration may be recognized. For example, the constraints may guarantee that every recognized matrix (or multiline expression) will have a regular structure and that columns and rows will be properly aligned.

A first constraint may be put on binary ConfProductions, and a second constraint may be put on unary productions on ConfRegions.

Constraint 1: Rewriting rule for ConfProduction MP on a partition P may be allowed only if P is a ConfPartition and ConfProduction MP has a same tag as ConfPartition.

A next constraint may ensure that a specific number of rows and cells is created (that number may be determined during matrix detection).

Constraint 2: Rewriting rule for unary production UP on a ConfRegion R may be disallowed if R contains at least one ConfPartition.

For example, 'MatrixRows→MatrixRow' may be disallowed on a ConfRegion R if there are more ConfPartitions inside R to process. Instead of this rewriting rule, a binary production may be applied, that is, 'MatrixRows→MatrixRows MatrixRow'. Only after a specific number of rows is created, rewriting rule 'MatrixRows→MatrixRow' may be allowed.

Exemplary Processing

Figure 7:
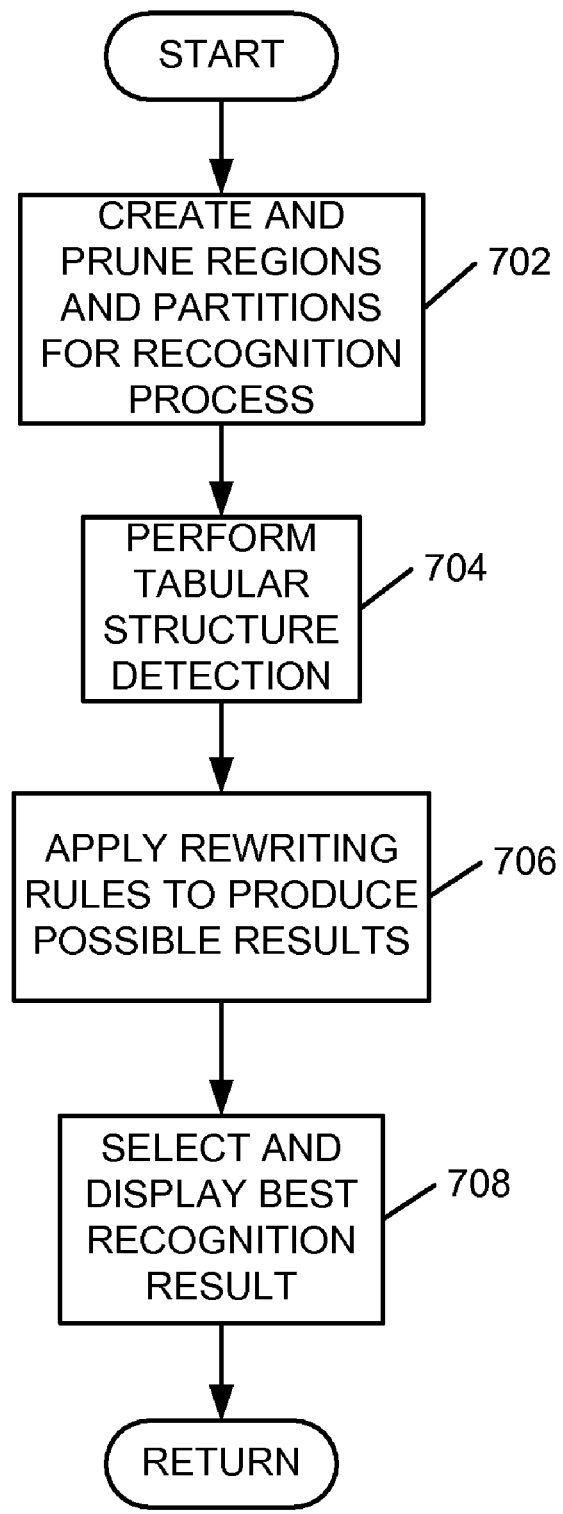
FIGS. 7-11 and 16 are flowcharts illustrating exemplary processes which may be performed in embodiments consistent with the subject matter of this disclosure.

FIG. 7 is a flowchart of an exemplary process, which may be performed in embodiments consistent with the subject matter of this disclosure, for recognizing tabular structures, such as, for example, matrices and multiline expressions. The process may begin with a processing device, such as, for example, processing device 100, creating and pruning regions and partitions for a recognition process (act 702). The regions and partitions may be created based on the grammar parsing framework, previously discussed. Next, the processing device may perform tabular structure detection (act 704).

Figure 8:
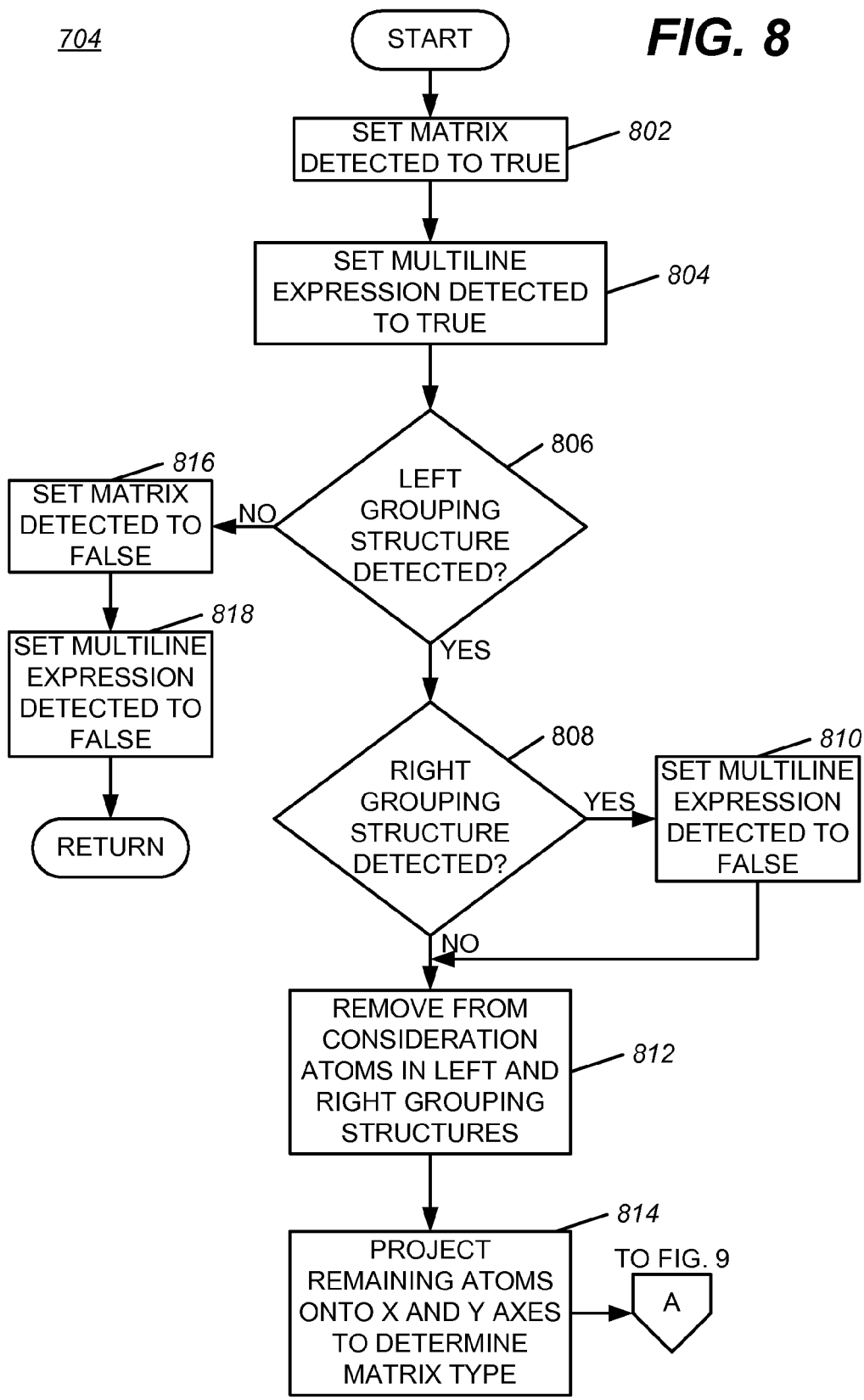

FIG. 8 is a flowchart illustrating an exemplary process for performing act 704. The process may be performed on every remaining region after the regions are pruned during ink parsing. The process may begin with the processing device setting a matrix detected flag to true (act 802) and setting a multiline expression detected flag to true (act 804).

Next, the processing device may determine if a left grouping structure is detected in, for example, one to three leftmost atoms of a candidate tabular structure (act 806). A left grouping structure may be any one of a left parenthesis, a left bracket, a left square brace, or a "∥". The processing device may determine whether certain conditions exist, with respect to detecting the left grouping structure. For example, in various embodiments, a ratio between a left grouping structure and a height of a remaining region may not be below a certain threshold. In some embodiments, the threshold may be a training parameter. Further, the left grouping structure may have grouping structure features, such as, for example, at least a certain height over weight ratio. In other embodiments, existence of additional conditions may be determined. If no left grouping structure is detected, then the processing device may set the matrix detected flag to false to indicate a failure to detect a matrix (act 816) and may set the multiline expression detected flag to false to indicate a failure to detect a multiline expression (act 818).

If the processing device detects a left grouping structure, then the processing device may determine whether a right grouping structure is detected in one to three rightmost atoms of a candidate tabular structure (act 808). A right grouping structure may be any one of a right parenthesis, a right bracket, a right square brace, or a "|". A number of conditions may be checked, as discussed above, with respect to the left grouping structure.

In some embodiments, at this stage, a symbol recognizer may verify detection of the left grouping structure and the right grouping structure. In other embodiments, the symbol recognizer may be used at a later stage to verify detection of the left grouping structure and the right grouping structure.

With respect to the example of FIG. 5, the detected left grouping structure is a region {1,2} and the detected right grouping structure is a region {9}.

If a right grouping structure is detected, then the processing device may set a multiline expression detection flag to false (act 810) because multiline expressions do not have a right grouping structure.

Next, the processing device may remove all atoms in the left grouping structure and the right grouping structure from consideration (act 812). With respect to the example of FIG. 5, atoms 1, 2, and 9 may be removed from consideration and remaining atoms are atoms 3, 4, 5, 6, 7, and 8. The remaining atoms may then be projected onto an x-axis and a y-axis to determine a matrix type (act 814). FIG. 6 shows projection of atoms 3, 4, 5, 6, 7, and 8 onto the x-axis and the y-axis. Matrix type may be determined based on projected peaks and gaps between peaks. In the example of FIG. 6, a maximal matrix type is 3×3 because, according to FIG. 6, there are 3 peaks on the y-axis and 3 peaks on the x-axis. Atoms may then be assigned to cells based on respective positions of the atoms. With respect to FIG. 6, the atoms may be assigned to cells as follows:

| 0   | 0   | {6} |
|-----|-----|-----|
| {3} | {4} | {7} |
| 0   | {5} | {8} |

Figure 10:
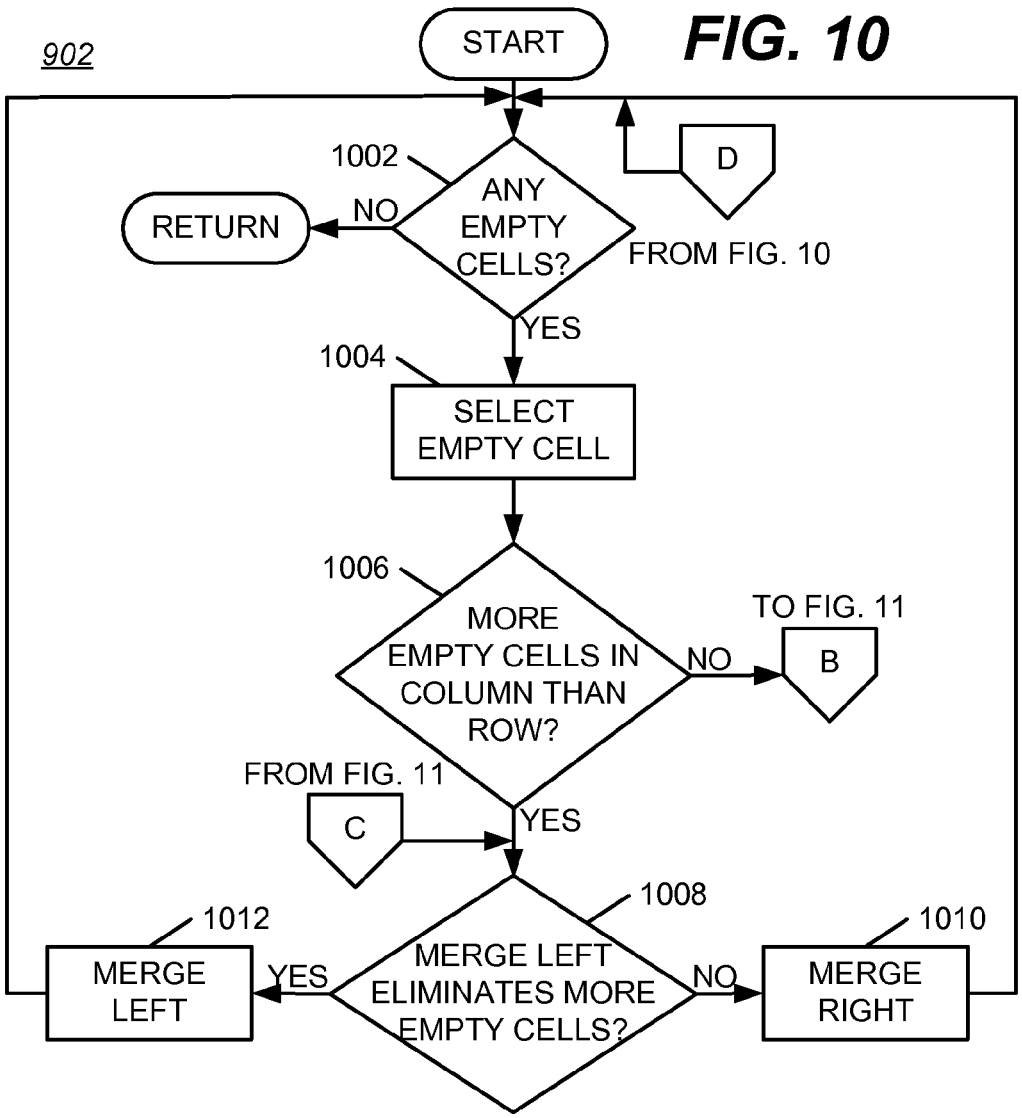

The processing device may then merge rows and/or columns (act 902). FIG. 10 is a flowchart of an exemplary process for performing act 902 in embodiments consistent with the subject matter of this disclosure. The process may begin with the processing device determining whether any empty cells exist (act 1002). If no empty cells exist, then the process is completed.

If any empty cells exist, then the processing device may select an empty cell (act 1004). The processing device may then determine whether there are more empty cells in a column containing the empty cell or in a row containing the empty cell (act 1006). If there are more empty cells in the column which contains the empty cell, then the processing device may determine whether merging in a left direction (with a left adjacent column) eliminates more empty cells than merging in a right direction (with a right adjacent column) (act 1008). If the empty cell happens to be in a leftmost column, then the check of act 1008 may indicate that merging with the left adjacent column does not eliminate more empty cells than merging with the right adjacent column. If the empty cell happens to be in a rightmost column, then the check of act 1008 may indicate that merging with the left adjacent column eliminates more empty cells than merging with the right adjacent column. In other words, if a column is a leftmost column, then merging may be performed only with a right adjacent column (and vice versa if a column is a rightmost column).

If, during act 1008, the processing device determines that merging with the left adjacent column eliminates more empty cells than merging with a right adjacent column, then the column including the empty cell may be merged with the left adjacent column (act 1012). Otherwise, the processing device may merge the column including the empty cell with the right adjacent column (act 1010).

Figure 11:
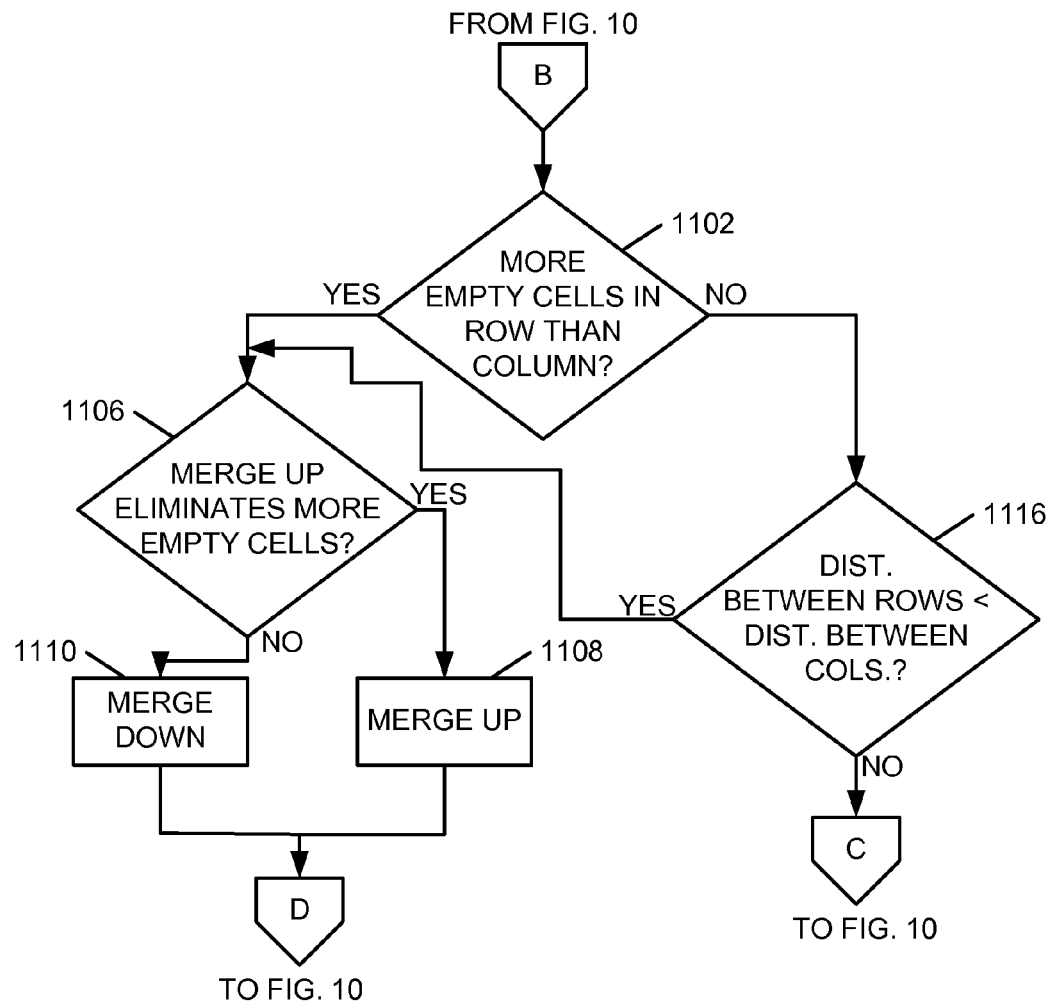

If, during act 1006, the processing device determines that there are not more empty cells in the column including the empty cell than in the row including the empty cell, then the processing device may determine whether there are more empty cells in the row including the empty cell than in the column including empty cell (act 1102; FIG. 11).

If, during act 1102, the processing device determines that there are more empty cells in the row including the empty cell than in the column including the empty cell, then the processing device may determine whether merging the row including the empty cell in an upward direction (with an adjacent row above) eliminates more empty cells than merging the row including the empty cell in a downward direction (with an adjacent row below) (act 1106). If the empty cell happens to be in a topmost row, then act 1106 may determine that merging with the adjacent row above does not eliminate more empty cells than merging with the adjacent row below. If the empty cell happens to be in a bottommost row, then act 1106 may determine that merging with the adjacent row above does eliminate more empty cells than merging when the adjacent row below. In other words, if a row is a topmost row, then merging may be performed only with an adjacent row below (and vice versa if a row is a bottommost row).

If, during act 1106, the processing device determines that merging with the adjacent row above eliminates more empty cells than merging with the adjacent row below, then the processing device may merge the row including the empty cell with the adjacent row above (act 1106). Otherwise, the processing device may merge the row including empty cell with the adjacent row below (act 1110). The processing device may then perform act 1002 again to determine whether any other empty cells exist.

If, during act 1102, the processing device determines that there are not more empty cells in the row including the empty cell than in the column including the empty cell, then the processing device may determine whether a distance between the row including the empty cell and an adjacent row is less than a distance between the column including empty cell and an adjacent column (act 1114). If the processing device determines that the distance between the row including the empty cell and an adjacent row is less than the distance between the column including the empty cell and an adjacent column, then the processing device may again perform act 1106 to determine whether merging the row including the empty cell with an adjacent row above eliminates more empty cells than merging the row including empty cell within a adjacent row below (act 1106). Otherwise, the processing device may again perform act 1008 to determine whether merging the column including the empty cell with an adjacent left column eliminates more empty cells than merging the column including the empty cell with an adjacent right column.

With respect to the example of FIG. 6, a first empty cell is in a first row, first column position. A number of empty cells in the first row is equal to a number of empty cells in the first column. The processing device may then determine whether a distance between the row including the empty cell and an adjacent row is less than a distance between a column including the empty cell and an adjacent column. Because projections of FIG. 6, corresponding to the first two rows, are closer than projections corresponding to a first two columns, rows may be merged. Further, because the empty cell is in a topmost row, the row including the empty cell may be merged with an adjacent row below resulting in:

| {3} | {4} | {6, 7} |
|-----|-----|--------|
| 0   | {5} | {8}    |

Only one empty cell remains in the second row, first column. Because a number of empty cells in the column including the empty cell is a same number as a number of empty cells in the row including the empty cell, distances between rows and columns may again be compared. Because columns are closer than rows, the processing device may perform a column merge resulting in:

| {3, 4} | {6, 7} |
|--------|--------|
| {5}    | {8}    |

Because no empty cells remain, the matrix may be determined to be a 2×2 type matrix.

Figure 9:
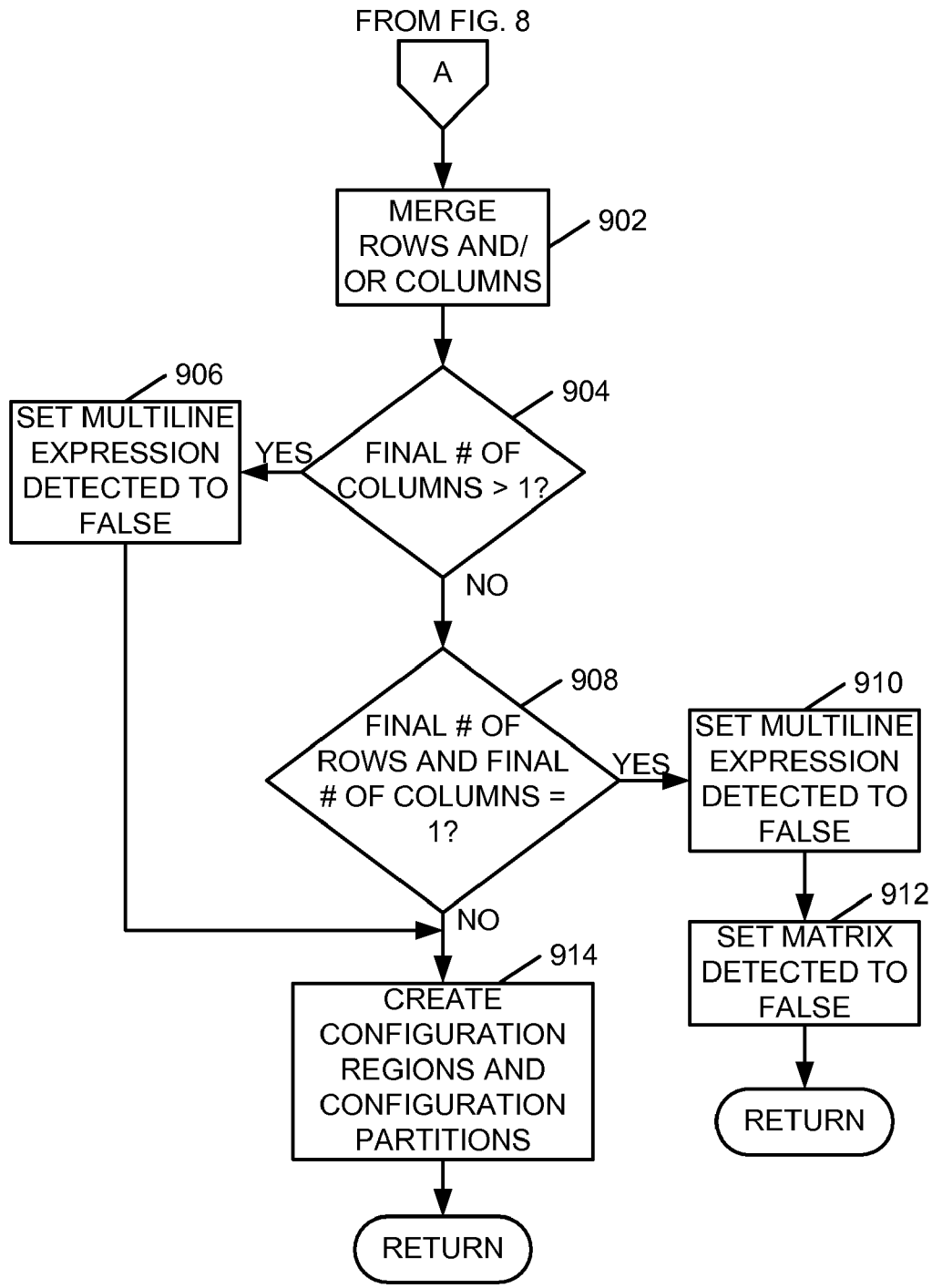

Returning to FIG. 9, the processing device may determine whether the final number of columns is greater than 1 (act 904). If the final number of columns is determined to be greater than 1, then the multiline expression detection flag may be set to false because multiline expressions may have only one column (act 906).

If the processing device determines that the final number of columns is not greater than 1, then the processing device may determine if the final number of rows and the final number of columns are equal to 1 (act 908). If the final number of columns and the final number of rows are equal to 1, then the processing device may set the multiline expression detection flag and the matrix detection flag to false (acts 910-912) because matrices have multiple rows and/or multiple columns, and multiline expressions have multiple rows.

If, during act 908, the processing device determines that the final number of rows and the final number of columns are not equal to 1, or after the processing device performs act 906, the processing device may create ConfRegions and ConfPartitions (act 914), which may be added to the remaining regions and partitions after performing parsing.

Returning to FIG. 7, a number of sequences of rewriting rules may then be applied to produce multiple possible recognition results (act 706). One of the multiple possible recognition results having a best score may be selected and displayed as a best recognition result (act 708). In some embodiments, a best recognition result may be a recognition result having a highest score among the multiple possible recognition results. In other embodiments, a best recognition results may be a recognition result having a lowest score among the multiple possible recognition results.

Correction Experience Features for Matrices and Multiline Expressions

Figure 12:
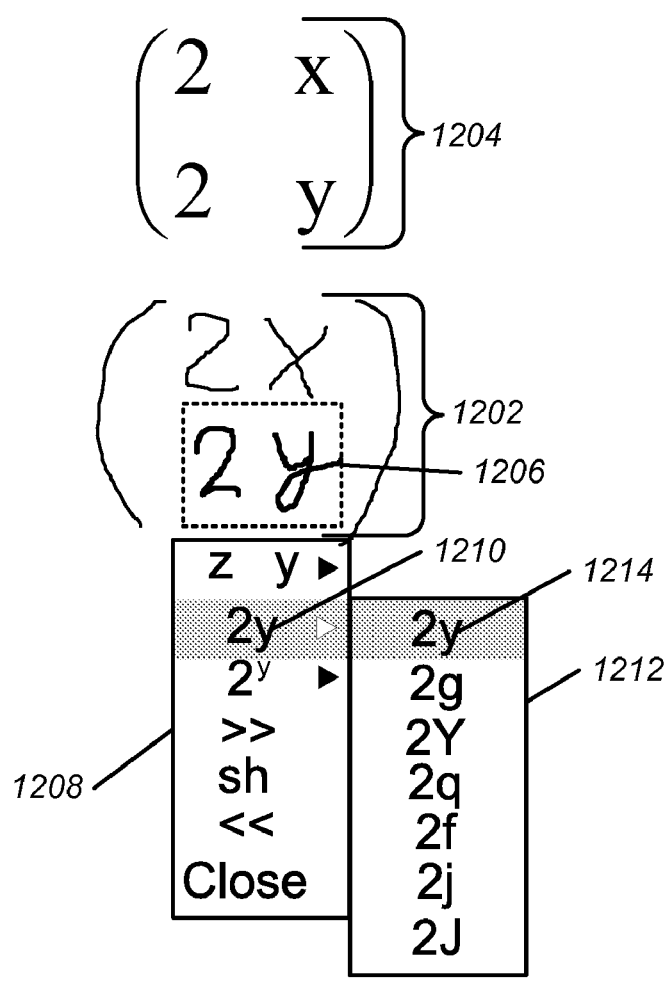
Figure 13:
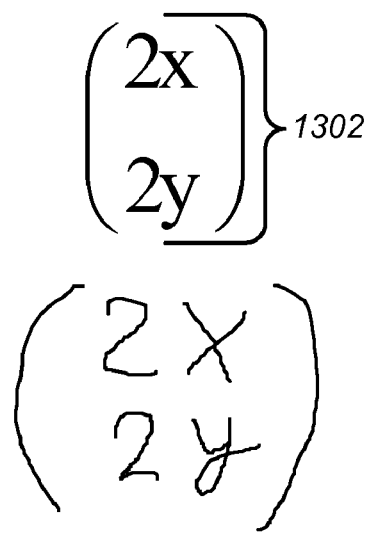

FIG. 12 shows an example of a matrix correction feature. Input atoms 1202 may be recognized to produce a recognition result 1204, which is a matrix having 2 rows and 2 columns. In this example, the user intended to input a matrix with 2 rows and 1 column. A user may select atoms 1206 using a selection tool, such as, for example, a lasso selection tool, to draw a lasso around the one or more atoms to define a region including atoms 1206. The selection tool may be used via a pointing device, such as, for example, a computer mouse, an electronic pen, a stylus or a user's finger on a touchscreen having a digitizer, or via other input methods. Alternatively, instead of using a lasso selection tool, another selection tool may be used. As a result, atoms 1206 may be recognized in isolation and a first menu 1208 may be displayed and may include possible recognition results. The user may select result 1210, which may cause a second menu 1212 to be displayed, which may include several possible alternate recognition results corresponding to result 1210. The user may then select alternate recognition result 1214 indicating that "2y" is to be recognized as part of a single matrix cell. FIG. 13 shows a correct recognition result 1302 after making the correction.

Figures 14, 15:
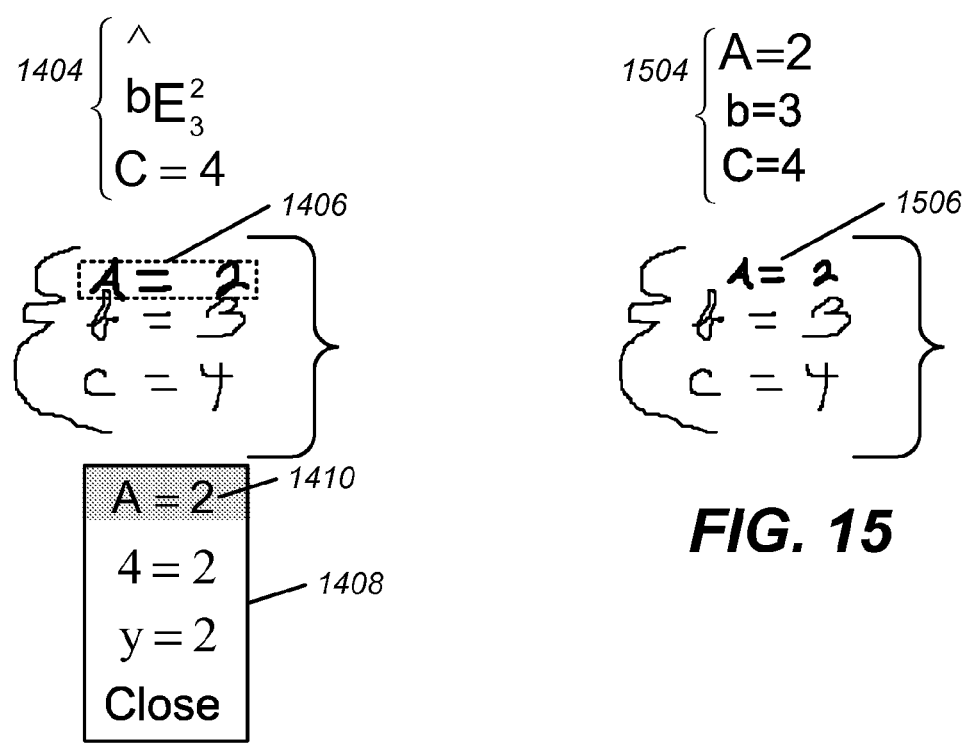

FIG. 14 illustrates an example in which a multiline expression is misrecognized. A first two rows of the multiline expression of FIG. 14 are crowded resulting in recognition results 1404, in which a first two rows have misrecognitions. The user may use a selection tool to select a misrecognized row from the multiline expression. FIG. 14 shows atoms 1406 being selected. As result of atoms 1406 being selected, menu 1408 may be displayed showing results of recognizing atoms 1406 in isolation. The user may select correct result 1410. Atoms 1406 may be shrunken such that the first two rows of the multiline expression are no longer crowded. FIG. 15 shows shrunken atoms 1506 corresponding to atoms 1406 of FIG. 14. Upon re-recognition, correct result 1504 may be produced.

Figure 16:
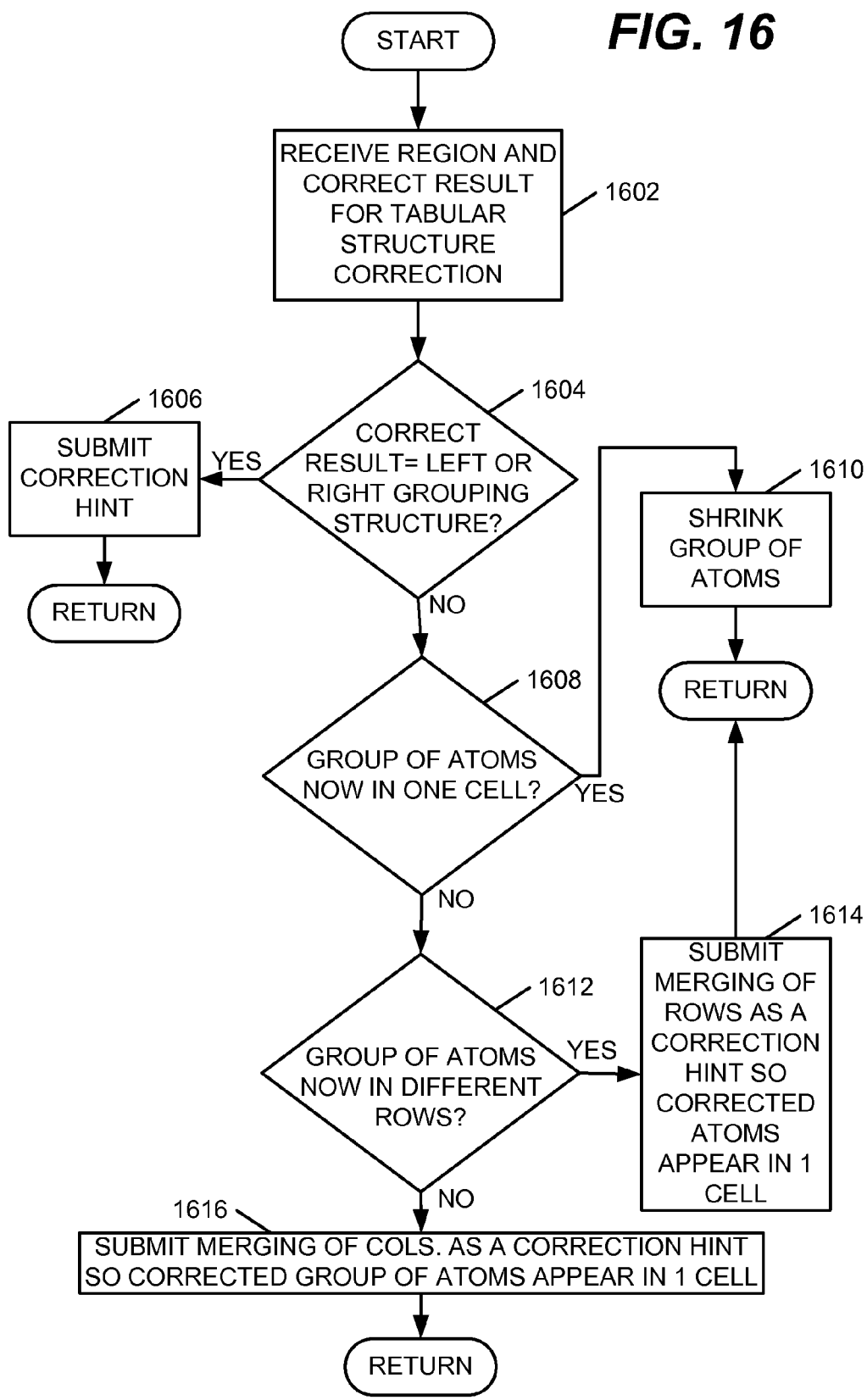

FIG. 16 is a flowchart illustrating an exemplary process, which may be performed in embodiments consistent with the subject matter of this disclosure, for correcting a tabular structure, such as, for example, a matrix, a multiline expression, or another tabular structure. The process may begin with a processing device receiving a correct result and a region for a tabular structure correction (act 1602). Next, the processing device may determine whether the correct result is a left grouping structure or right grouping structure (act 1604). If the correct result is a left grouping structure or a right grouping structure, then a correction hint, corresponding to the correct result and the region, may be submitted to be used during recognition, such that the correction hint may be leveraged to produce a correct recognition result (act 1606).

If the correct result is not a left grouping structure or a right grouping structure, then the processing device may determine whether a group of atoms of the received region are currently in one cell (act 1608). If the group of atoms are determined to be in one cell, then the processing device may shrink the group of atoms to improve recognition (act 1610).

If, during act 1608, the processing device determines that the group of atoms are not currently in one cell, then the processing device may determine whether the group of atoms are currently in different rows (act 1612). If the group of atoms are determined to currently be in different rows, then the processing device may merge the rows, such that the corrected atoms may be in one cell (act 1614). If the group of atoms are determined to not currently be in different rows, then the group of atoms may be assumed to be in different columns and the columns may be merged, such that the group of atoms may be in one cell (act 1616).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. For example, the scope of this disclosure may include detection of other types of tabular structures, other than matrices and multiline expressions, using techniques described in this disclosure. Further, implementations consistent with the subject matter of this disclosure may have more or fewer acts than as described in FIGS. 7-11 and 16, or may implement acts in a different order than as shown in FIGS. 7-11 and 16. Accordingly, the appended claims and their legal equivalents define the scope of the invention, rather than any specific examples given.

We claim as our invention:

1. A machine-implemented method for recognizing a handwritten input including a tabular structure formed from a plurality atoms, the machine-implemented method comprising:

creating configuration regions and configuration partitions;

applying a plurality of rewriting rules of an extended grammar parsing framework to atoms, included in a plurality of regions and a plurality of partitions, to produce a plurality of recognition results, the plurality of regions including the created configuration regions, the plurality of partitions including the created configuration partitions, and the extended grammar parsing framework having been formed by adding a plurality of tabular structure productions to a grammar parsing framework, the applying of a plurality of rewriting rules of an extended grammar parsing framework to atoms, included in a plurality of regions and a plurality of partitions, to produce a plurality of recognition results, further comprising:

preventing an application of a unary production on a configuration region if the configuration region includes at least one configuration partition; and selecting and displaying a best recognition result from among the plurality of recognition results, wherein the machine-implemented method is performed by a processing device.

2. The machine-implemented method of claim 1, wherein the applying of a plurality of rewriting rules of an extended grammar parsing framework to atoms, included in a plurality of regions and a plurality of partitions, to produce a plurality of recognition results, further comprises:

allowing a rewriting rule including a tabular structure production to be applied on a partition only if the partition is a configuration partition and the tabular structure production has a same tag as the configuration partition.

3. The machine-implemented method of claim 1, wherein the creating of configuration regions and configuration partitions further comprises:

detecting a left grouping structure from the plurality of atoms, removing from consideration atoms forming the left grouping structure and leaving a remaining group of atoms for consideration, projecting the remaining group of atoms onto an x axis and a y axis to determine a number of rows and a number of columns, assigning ones of the remaining group of atoms to respective cells of the rows and the columns based on a position of each of the respective ones of the remaining group of atoms, merging a pair of the rows of cells or a pair of the columns of cells when at least one empty cell exists to eliminate the at least one empty cell, validating a final number of rows and a final number of columns, and creating the configuration regions and the configuration partitions based on at least one atom of the detected left group structure, atoms of the cells, and the plurality of tabular structure productions of the extended grammar parsing framework.

4. The machine-implemented method of claim 3, further comprising:

determining, from the plurality of atoms, whether a right grouping structure exists;

failing matrix detection when the right grouping structure is determined not to exist; and failing multiline expression detection when the right grouping structure is determined to exist.

5. The machine-implemented method of claim 3, wherein the validating of a final number of rows and a final number of columns further comprises:

failing matrix detection and multiline expression detection when the final number of rows is 1 and the final number of columns is 1, and failing the multiline expression detection when the final number of columns is greater than 1.

6. The machine-implemented method of claim 3, further comprising:

receiving a correction hint with respect to a misrecognition of the tabular structure, the correction hint including a group of atoms;

detecting whether the atoms of the group of atoms are assigned to multiple cells; and merging a pair of the rows or a pair of the columns when the atoms of the group of atoms are detected as being assigned to the multiple cells.

7. The machine-implemented method of claim 3, further comprising:

receiving a correction hint with respect to a misrecognition of the tabular structure, the correction hint including at least one atom of a cell and no atoms of any other cell, the correction hint including fewer than all atoms of the cell;

shrinking the at least one atom of the correction hint; and repeating the creating of configuration regions and configuration partitions, the applying of the plurality of rewriting rules of an extended grammar, and the selecting and displaying of a best recognition result.

8. A processing device comprising:

at least one processor; and a memory connected to the at least one processor, the memory including instructions for the at least one processor to perform a method, the method comprising:

detecting an existence of a tabular structure within handwritten input including a plurality of atoms, applying a plurality of rewriting rules of an extended grammar parsing framework to atoms, included in a plurality of regions and a plurality of partitions, to produce a plurality of recognition results, the extended grammar parsing framework having been formed by adding a plurality of tabular structure productions to a grammar parsing framework, the applying of a plurality of rewriting rules of an extended grammar parsing framework to atoms, included in a plurality of regions and a plurality of partitions, to produce a plurality of recognition results, further comprising:

preventing an application of a unary production on a configuration region if the configuration region includes at least one configuration partition; and selecting and displaying a best recognition result from among the plurality of recognition results.

9. The processing device of claim 8, wherein the plurality of tabular structure productions further comprise:

defining a Matrix tabular structure as a LeftBracket structure, a MatrixBodyRightBracket structure and a first tag, defining the MatrixBodyRightBracket tabular structure as a MatrixBody structure, a RightBracket structure and the first tag, defining the MatrixBody structure as a MatrixRows structure, defining the MatrixRows structure as the MatrixRows structure, a MatrixRow structure and a second tag, defining the MatrixRows structure as a MatrixRow structure, defining the MatrixRow structure as a MatrixCells structure, a MatrixCell structure and a third tag, defining the MatrixCells structure as the MatrixCell structure, and defining the MatrixCell structure as an Expression structure, wherein:

the LeftBracket structure represents a left bracket, the RightBracket structure represents a right bracket, and the Expression structure represents a mathematical expression.

10. The processing device of claim 8, wherein the detecting an existence of a tabular structure within handwritten input including a plurality of atoms, further comprises:
    detecting a left grouping structure based on the plurality of atoms,
    removing from consideration atoms forming the left grouping structure and leaving a remaining group of atoms for consideration,
    projecting the remaining group of atoms onto an x-axis and a y-axis to determine a number of rows and a number of columns,
    assigning ones of the remaining group of atoms to respective cells of the rows and the columns based on a position of each of the respective ones of the remaining group of atoms,
    merging a pair of the rows of cells or a pair of the columns of cells when at least one empty cell exists to eliminate the at least one empty cell, and
    validating a final number of rows and a final number of columns.

11. The processing device of claim 10, wherein the merging a pair of the rows of cells or a pair of the columns of cells when at least one empty cell exists to eliminate the at least one empty cell, further comprises:
    determining whether more empty cells exist in a row of one of the at least one empty cell or in a column of the at least one empty cell,
    merging a pair of rows of cells when more empty cells are determined to exist in a row of one of the at least one empty cell,
    merging a pair of columns of cells when more empty cells are determined to exist in a column of one of the at least one empty cell, and
    choosing a merging direction such that a number of remaining empty cells will be a minimum number after merging.

12. The processing device of claim 10, wherein the method further comprises:
    receiving a correction hint with respect to a misrecognition of the tabular structure, the correction hint including a group of atoms;
    detecting whether the atoms of the group of atoms are assigned to multiple cells; and
    merging a pair of the rows or a pair of the columns when the atoms of the group of atoms are detected as being assigned to the multiple cells.

13. The processing device of claim 10, wherein the method further comprises:
    receiving a correction hint with respect to a misrecognition of the tabular structure, the correction hint including at least one atom of a cell and no atoms of any other cell, the correction hint including fewer than all atoms of the cell; and
    shrinking the at least one atom of the correction hint.

14. The processing device of claim 8, wherein the detecting an existence of a tabular structure within handwritten input including a plurality of atoms, further comprises:
    detecting a left grouping structure based on the plurality of atoms,
    detecting a right grouping structure based on the plurality of atoms,
    removing from consideration atoms forming the left grouping structure and the right grouping structure and leaving a remaining group of atoms for consideration,
    projecting the remaining group of atoms onto an x axis and a y axis to determine a number of rows and a number of columns,
    assigning ones of the remaining group of atoms to respective cells of the rows and the columns based on a position of each of the respective ones of the remaining group of atoms,
    merging a pair of the rows of cells or a pair of the columns of cells when at least one empty cell exists to eliminate the at least one empty cell, and
    validating a final number of rows and a final number of columns.

15. A machine-readable storage medium having instructions recorded therein for at least one processor, such that when the at least one processor executes the instructions, a method is performed comprising:
    detecting, by the at least one processor, an existence of a matrix structure or a multiline expression structure formed by a plurality of atoms of handwritten input;
    applying, by the at least one processor, a plurality of rewriting rules of an extended grammar parsing framework to atoms, included in a plurality of regions and a plurality of partitions, to produce a plurality of recognition results, the plurality of regions including a plurality of configuration regions and the plurality of partitions including a plurality of configuration partitions, the extended grammar parsing framework having been formed by adding a plurality of tabular structure productions to a grammar parsing framework, the applying a plurality of rewriting rules of an extended grammar parsing framework to atoms, included in a plurality of regions and a plurality of partitions, to produce a plurality of recognition results, further comprising:
        preventing an application of a unary production on a configuration region if the configuration region includes at least one configuration partition; and
    selecting and displaying, by the at least one processor, a best recognition result from among the plurality of recognition results.

16. The machine-readable storage medium of claim 15, wherein the selecting and displaying a best recognition result from among the plurality of recognition results further comprises:
    selecting the best recognition result from among a plurality of possible recognition results based on a sum of scores assigned to each one of the plurality of rewriting rules applied to produce each respective one of the plurality of possible recognition results.

17. The machine-readable storage medium of claim 15, wherein the detecting an existence of a matrix structure or a multiline expression structure formed by a plurality of atoms of handwritten input further comprises:
    detecting a left bracket structure based on the plurality of atoms,
    removing from consideration atoms forming the left bracket structure and leaving a remaining group of atoms for consideration,
    projecting the remaining group of atoms onto an x-axis and a y-axis to determine a number of rows and a number of columns,
    assigning ones of the remaining group of atoms to respective cells of the rows and the columns based on a position of each of the respective ones of the remaining group of atoms,
    merging a pair of the rows of cells or a pair of the columns of cells when at least one empty cell exists to eliminate the at least one empty cell, and validating a final number of rows and a final number of columns.

18. The machine-readable storage medium of claim 17, wherein the validating a final number of rows and a final number of columns further comprises:

indicating a failure to detect the matrix structure and for indicating a failure to detect the multiline expression when the final number of rows is 1 and the final number of columns is 1, and indicating a failure to detect the multiline expression when the final number of columns is greater than 1.

19. The machine-implemented method of claim 1, wherein the selecting and displaying a best recognition result from among the plurality of recognition results further comprises:

selecting the best recognition result from among a plurality of possible recognition results based on a sum of scores assigned to each one of the plurality of rewriting rules applied to produce each respective one of the plurality of possible recognition results.

20. The machine-readable storage medium of claim 15, wherein the applying a plurality of rewriting rules of an extended grammar parsing framework to atoms, included in a plurality of regions and a plurality of partitions, to produce a plurality of recognition results, further comprises:

allowing a rewriting rule including a tabular structure production to be applied on a partition only if the partition is a configuration partition and the tabular structure production has a same tag as the configuration partition.

* * * * *